United States Patent
Eastwood et al.

(10) Patent No.: US 10,550,725 B2
(45) Date of Patent: Feb. 4, 2020

(54) ENGINE CASES AND ASSOCIATED FLANGE

(71) Applicant: United Technologies Corporation, Farmington, CT (US)

(72) Inventors: Jonathan J. Eastwood, West Hartford, CT (US); Timothy Dale, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 539 days.

(21) Appl. No.: 15/297,459

(22) Filed: Oct. 19, 2016

(65) Prior Publication Data

US 2018/0230856 A1 Aug. 16, 2018

(51) Int. Cl.
*F01D 25/24* (2006.01)
*F01D 25/14* (2006.01)
*F01D 11/00* (2006.01)

(52) U.S. Cl.
CPC .......... *F01D 25/243* (2013.01); *F01D 11/005* (2013.01); *F01D 25/145* (2013.01); *F05D 2240/11* (2013.01); *F05D 2240/14* (2013.01); *F05D 2260/231* (2013.01); *F05D 2260/30* (2013.01)

(58) Field of Classification Search
CPC .......... F01D 9/023; F01D 9/065; F01D 25/24; F01D 25/26; F01D 25/14; F05D 2240/126; F05D 2260/2212; F05D 2260/22141
USPC .......................................... 415/209.2, 209.3
See application file for complete search history.

(56) References Cited

U.S. PATENT DOCUMENTS

| | | | | |
|---|---|---|---|---|
| 3,363,416 A | * | 1/1968 | Heybyrne | F01D 9/042 415/208.1 |
| 3,918,832 A | * | 11/1975 | Shuttleworth | F01D 9/042 415/193 |
| 4,621,499 A | * | 11/1986 | Mori | F01D 25/005 148/410 |
| 5,080,555 A | | 1/1992 | Kempinger | |
| 5,133,640 A | * | 7/1992 | Groenendaal, Jr. | F01D 25/26 415/108 |
| 5,205,115 A | | 4/1993 | Plemmons | |
| 5,219,268 A | * | 6/1993 | Johnson | F01D 11/24 415/115 |
| 5,343,694 A | * | 9/1994 | Toborg | F01D 9/042 415/209.2 |

(Continued)

OTHER PUBLICATIONS

D.E. Brandt, "GE Gas Turbine Design Philosophy", GE Power Generation, GER-3434D, available from: <https://powergen.gepower.com/content/dam/gepower-pgdp/global/en_US/documents/technical/ger/ger-3434d-ge-gas-turbine-design-philosophy.pdf> as of Sep. 6, 2016.

(Continued)

*Primary Examiner* — Kenneth Bomberg
*Assistant Examiner* — Andrew Thanh Bui
(74) *Attorney, Agent, or Firm* — O'Shea Getz P.C.

(57) ABSTRACT

Aspects of the disclosure are directed to a system for an engine having an axial centerline, comprising: a diffuser case, a turbine case, and a turbine vane support, where the diffuser case and the turbine case are coupled to one another via a substantially radially oriented flange, where the turbine vane support includes a heat shield for the flange, and where the turbine vane support includes a radially outward projecting tab that couples to the turbine case via a radial interference fit.

12 Claims, 5 Drawing Sheets

(56) References Cited

U.S. PATENT DOCUMENTS

| | | | |
|---|---|---|---|
| 5,605,438 A | 2/1997 | Burdgick | |
| 5,771,577 A * | 6/1998 | Gupta | F01D 5/186 29/889.72 |
| 6,352,404 B1 | 3/2002 | Czachor | |
| 6,675,585 B2 * | 1/2004 | Calvez | F23R 3/007 60/753 |
| 6,830,427 B2 | 12/2004 | Lafarge | |
| 7,752,851 B2 * | 7/2010 | Daguenet | F01D 25/243 60/752 |
| 8,403,630 B2 * | 3/2013 | Guemmer | F01D 9/065 415/110 |
| 8,459,941 B2 | 6/2013 | Jasko | |
| 8,776,533 B2 | 7/2014 | Feindel | |
| 9,169,737 B2 | 10/2015 | Aiello | |
| 2012/0177495 A1 * | 7/2012 | Virkler | F01D 5/066 416/182 |
| 2013/0291544 A1 | 11/2013 | Eastwood et al. | |
| 2014/0133976 A1 * | 5/2014 | Remy | F01D 25/243 415/213.1 |
| 2016/0146033 A1 | 5/2016 | LeBlanc et al. | |

OTHER PUBLICATIONS

Lucjan Witek, "Thermal Fatigue Problems of Turbine Casing", Fatigue of Aircraft Structures, vol. 1, pp. 205-211, 2009.
Cyrus B. Meher-Homji, "Gas Turbine Performance Deterioration", Proceedings of The 30th Turbomachinery Symposium, pp. 139-176, available from <http://turbolab.tamu.edu/proc/turboproc/T30/t30pg139.pdf> as of Sep. 6, 2016.
Finn Rundstrom, "Optimisation of Low Cycle Fatigue Life in Turbine Rear Frame", Master of Science Thesis MMK 2007:1 MPK577, KTH Industrial Engineering and Management Machine Design, SE-100 44 Stockholm, available from <http://www.diva-portal.org/smash/get/diva2:544622/fulltext01> as of Sep. 6, 2016.
Extended EP Search Report for EP Appln. No. 17196923.1 dated Jan. 5, 2018.

* cited by examiner

ENGINE CASES AND ASSOCIATED FLANGE

BACKGROUND

Gas turbine engines, such as those which power aircraft and industrial equipment, employ a compressor to compress air that is drawn into the engine and a turbine to capture energy associated with the combustion of a fuel-air mixture.

There are frequently several flanges located at or near the exterior of the engine that separate the various sections of the engine. For example, and referring to the system 200 of FIG. 2, a flange 204 serves to separate a diffuser case 210 and a high pressure turbine (HPT) case 216. The flange 204 includes one or more holes to seat one or more fasteners (e.g., a bolt 222 and a nut 228) to couple the cases 210 and 216 to one another.

The portion of the engine in proximity to the flange 204 is typically one of the hottest, as the portion is located radially outboard of a combustion chamber 234. The flange 204 features two distinct areas where the radial interference of two parts form an interference fit; this occurs at the fully circumferential landing between the diffuser case 210 and the HPT case 216. The radially inner surface of this landing also provides a mating face to a first stage HPT turbine vane support 240 of a first stage HPT vane 246.

The arrangement of the system 200 results in the radially inner portion of the flange 204 being at a much higher temperature than the radially outer portion of the flange 204 where the holes are that seat the bolts 222. The temperature gradient could vary as much as, e.g., 400° Fahrenheit depending on the power settings of the engine. This temperature gradient results in thermally driven stress in the flange 204, which results in a low lifetime (frequently referred to in the art as a low cycle fatigue (LCF)) limit in the diffuser case 210.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system for an engine having an axial centerline, comprising: a diffuser case, a turbine case, and a turbine vane support, where the diffuser case and the turbine case are coupled to one another via a substantially radially oriented flange, where the turbine vane support includes a heat shield for the flange, and where the turbine vane support includes a radially outward projecting tab that couples to the turbine case via a radial interference fit. In some embodiments, the diffuser case includes a curved ramp to encourage a combustion airflow to flow over the turbine vane support and away from the extension portion. In some embodiments, the turbine case includes a radially inward projecting tab that discourages a combustion airflow from flowing in an aft to forward direction. In some embodiments, a radial interference fit is formed between the diffuser case and the turbine case. In some embodiments, the radial interference fit is located radially outward of the flange. In some embodiments, the system further comprises a vane coupled to the turbine vane support, and a tab formed in the turbine vane support that prevents the vane from rotating in an amount greater than a threshold. In some embodiments, the system further comprises a tab formed in the turbine vane support that couples to a combustor lock. In some embodiments, the system further comprises a bolt and a nut that couple the tab in the turbine vane support to the combustor lock. In some embodiments, the turbine vane support includes a slot that seats an extension that emanates from the diffuser case to prevent the turbine vane support from rotating in an amount greater than a threshold. In some embodiments, the extension portion is approximately 1.5 inches in axial length. In some embodiments, the extension portion is approximately 0.050 inches in radial thickness. In some embodiments, the extension portion is made of a nickel alloy. In some embodiments, the system further comprises a bolt and a nut that are seated with respect to a hole formed in the flange.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

Figure 1:
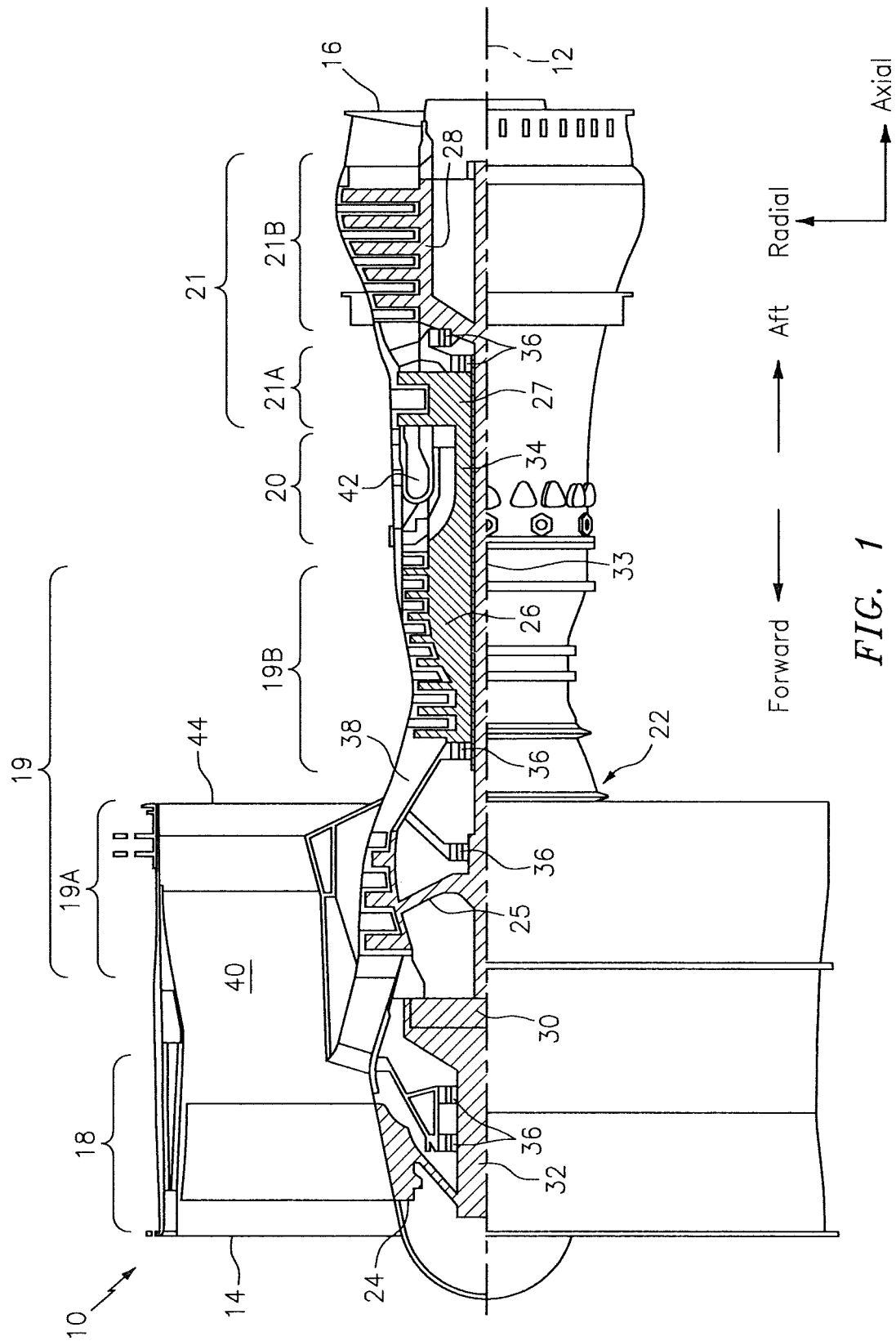
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to a flange associated with a diffuser case and a turbine case. In some embodiments, the flange may be coupled to a turbine vane support, where a portion of the turbine vane support serves as a heat shield for the flange. The turbine vane support may include features that enable the turbine vane support to be coupled to the diffuser case and the turbine case.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3A:
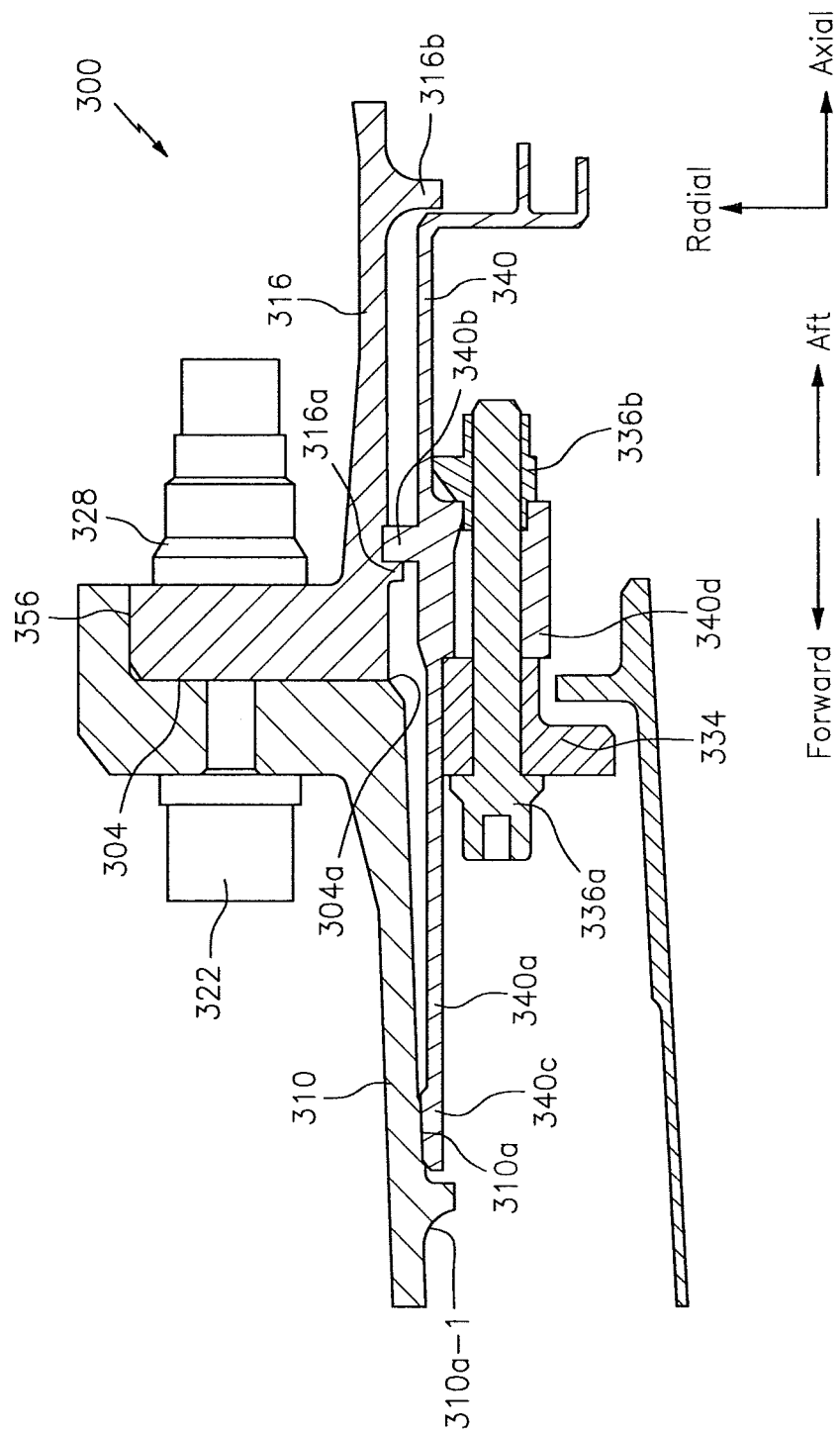
FIG. 3A illustrates a system incorporating a flange for joining a diffuser case and a turbine case of an engine in accordance with aspects of this disclosure.

Referring to FIG. 3A, a system 300 is shown. The system 300 may be incorporated as part of an engine, such as for example the engine 10 of FIG. 1. The system 300 may include a flange 304, a diffuser case 310, and a turbine case 316 (e.g., a high pressure turbine case). The cases 310 and 316 may meet/couple to one another via the flange 304. For example, the flange 304 may include a hole to seat a fastener (e.g., bolt 322 and nut 328) that may couple the cases 310 and 316 to one another.

Figure 2:
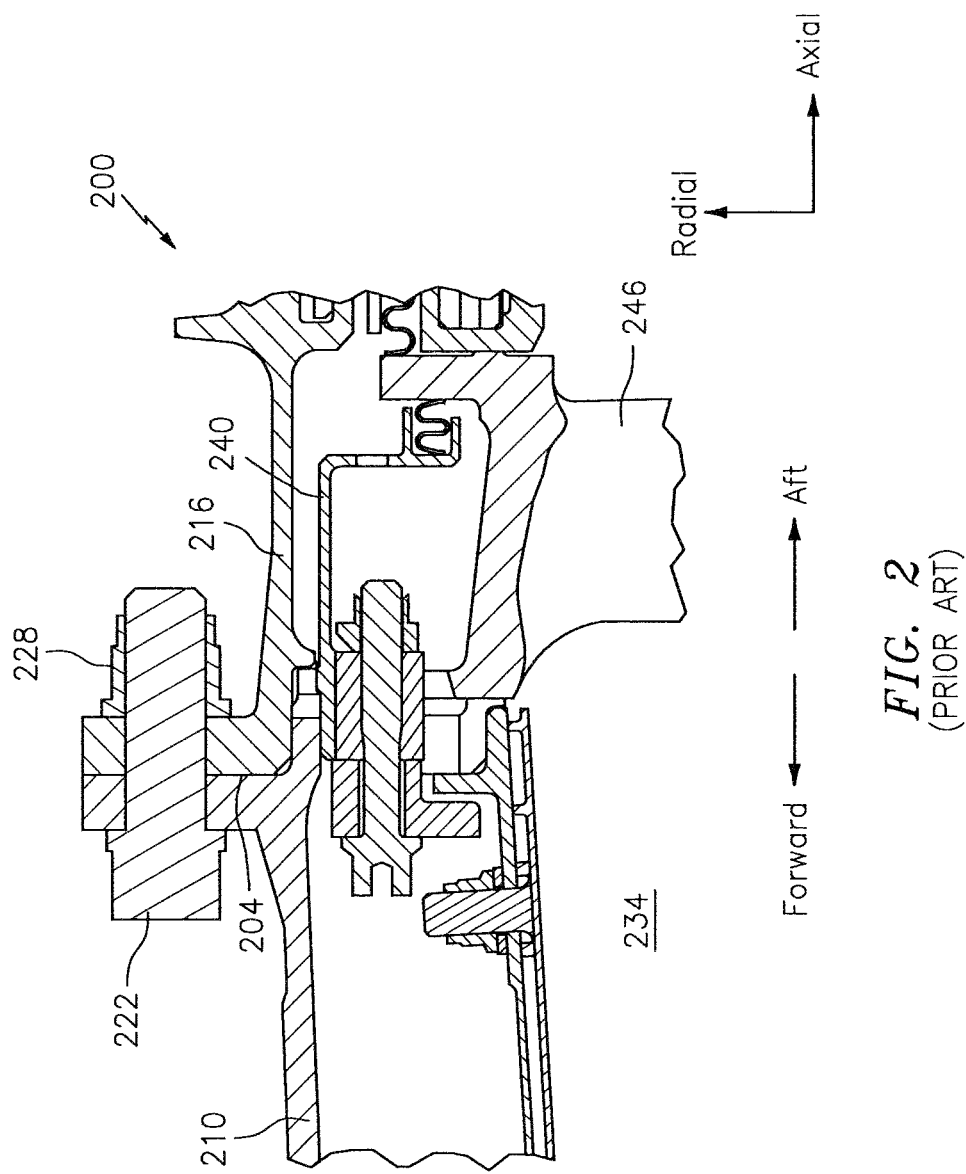
FIG. 2 illustrates a prior art system incorporating a flange for joining a diffuser case and a turbine case of an engine.

Relative to the system 200/turbine vane support 240 of FIG. 2, in the system 300 of FIG. 3A a turbine vane support 340 may be extended axially forward approximately 1.5 inches (approximately 3.8 centimeters); this extension is denoted in FIG. 3A by reference character 340a. This extension 340a in the turbine vane support 340 (relative to the turbine vane support 240) may be used to form a heat shield. More specifically, a reduction in conduction into a base 304a of the flange 304 may be obtained via the extension 340a. At least a portion of this extension 340a may be approximately 0.050 inches (approximately 1.27 millimeters) thick in the radial reference direction. The turbine vane support 340 (e.g., the extension 340a) may be made from one or more materials, e.g., a nickel alloy.

The turbine vane support 340 may include a radially outward projecting tab 340b that may contact/couple to the case 316 via a radial interference fit. The case 316 may include one or more tabs (e.g., tab 316a) that may project radially inward and may provide axial retention of the turbine vane support 340. The interface between the tab 316a and the tab 340b may also provide/function as a seal.

The case 316 may include one or more additional tabs (e.g., radially inward projecting tab 316b) that may serve to discourage airflow from flowing aft to forward, where such airflow may be at least partially attributable to vortices that may be generated as part of the combustion in the combustion chamber. While not shown, in some embodiments a compliant seal may be used to couple/interface the turbine vane support 340 and the tab 316b.

At or near the forward end of the turbine vane support 340 the turbine vane support 340 may include a snap 340c (e.g., a radial snap) that may form a seal/interference fit with respect to the case 310. The case 310 may include a landing 310a on a radially inner surface of the case 310 to accommodate the snap 340c. The front of this landing 310a may include, e.g., a curved ramp 310a-1 to enable/encourage airflow to flow over the turbine vane support 340 and away from the heat shield formed by the extension 340a. The degree/extent of the curvature associated with the ramp 310a-1 may be based on one or more of a thermal analysis, simulation, testing, etc.

A radial snap/interference fit may be formed between the cases 310 and 316 as shown via reference character 356 in FIG. 3A. The interference fit 356 may help to keep the cases 310 and 316 aligned/centered with respect to one another. The interference fit 356 may be located radially outward/outboard of the flange 304. Locating the interference fit 356 outward of the flange 304 may enhance the radial clearance between the turbine vane support 340 and the cases 310 and 316 in the area proximate (e.g., radially inward of) the flange 304. Increasing the radial clearance between the turbine vane support 340 and the cases 310 and 316 may provide additional thermal protection for the flange 304 beyond the thermal protection provided by the extension/heat shield 340a.

Figure 3C:
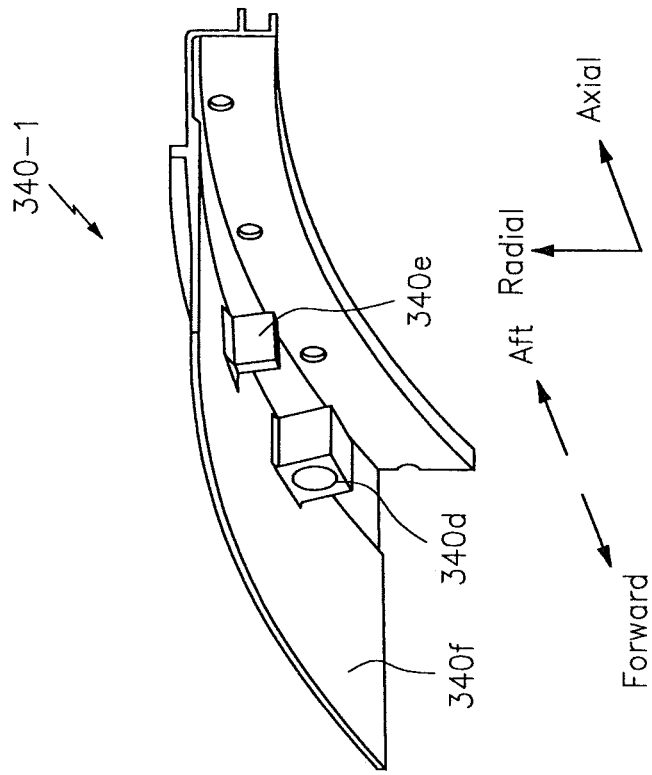
FIG. 3C illustrates a portion of the turbine vane support of FIG. 3B.
Figure 3B:
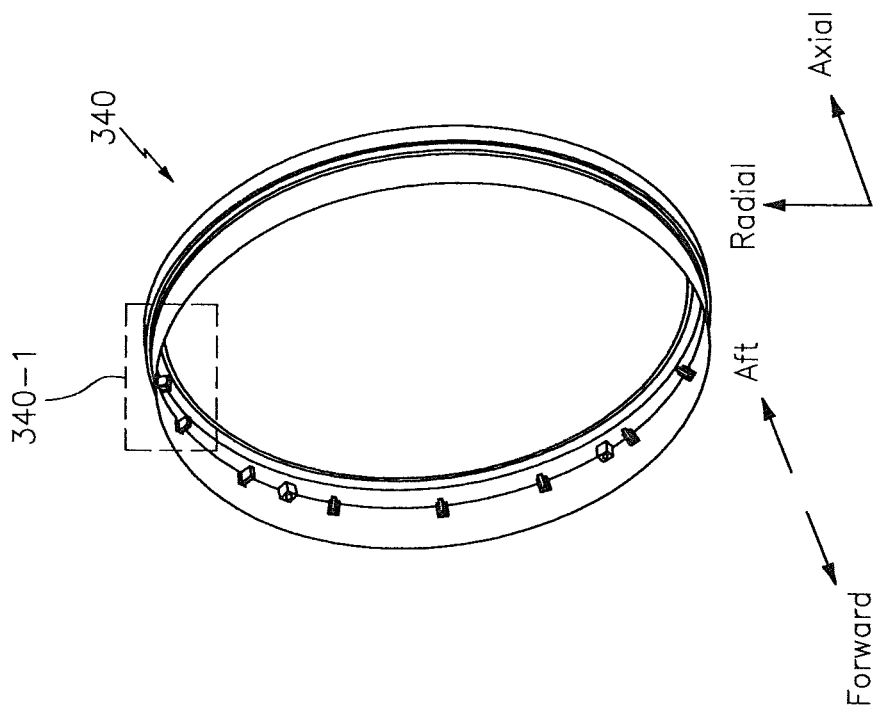
FIG. 3B illustrates a turbine vane support of the system of FIG. 3A.
Figure 3D:
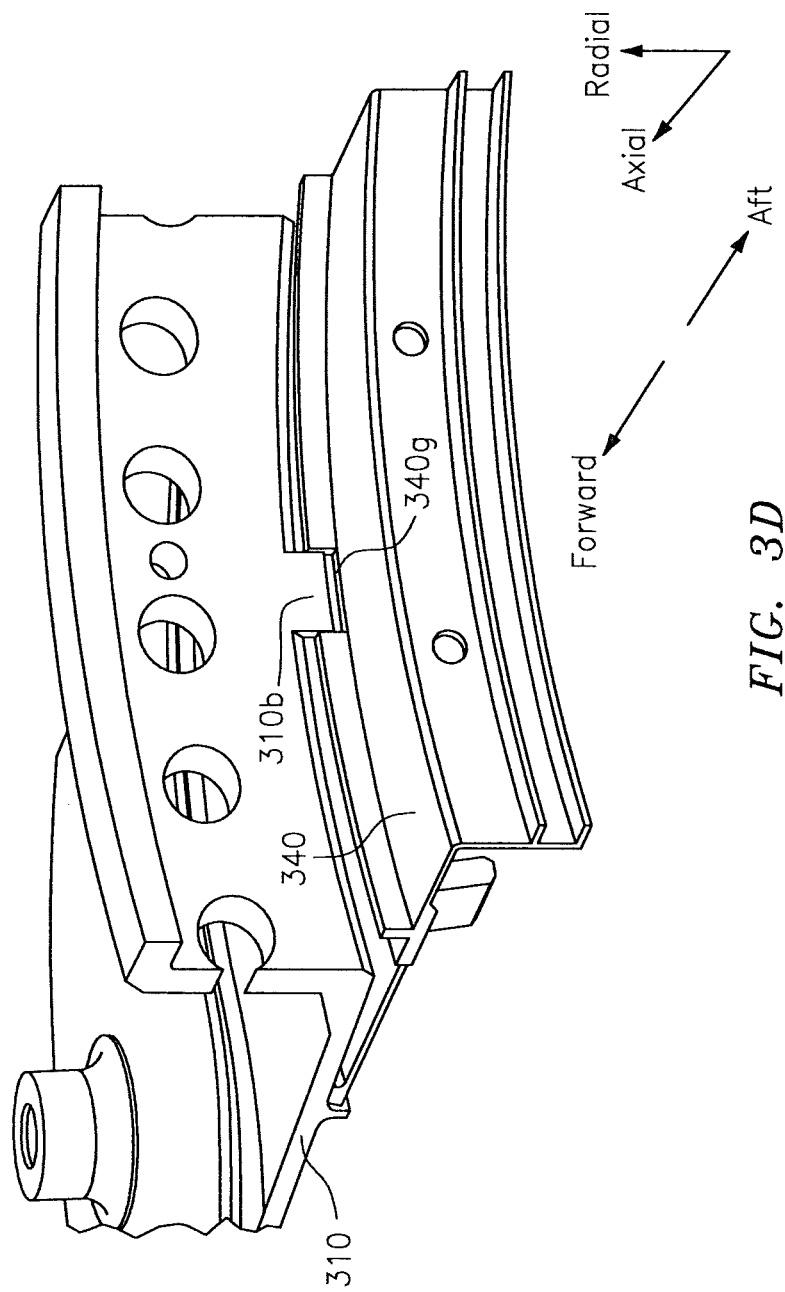
FIG. 3D illustrates a turbine vane support in relation to a diffuser case.

FIG. 3B represents an additional view of the turbine vane support 340. As shown in FIG. 3B, the turbine vane support 340 may be formed as a fully circumferential, ring-like structure. A portion of the turbine vane support 340 is indicated in the box 340-1 in FIG. 3B. This boxed portion 340-1 of the turbine vane support 340 is shown in greater detail in FIG. 3C. As shown in FIG. 3C, the turbine vane support 340 may include one or more combustor lock mounting tabs 340d and one or more anti-rotation tabs 340e. The tabs 340d may be used for mounting the turbine vane support 340 to the combustor of the engine. For example, a tab 340d may couple to a combustor lock 334 via a bolt 336a and a nut 336b (see FIGS. 3A and 3C). The tabs 340e may prevent rotation of the vanes (e.g., vanes 246 of FIG. 2) in an amount greater than a threshold. The tabs 340d and 340e may project radially inward with respect to a (radially inner) surface 340f of the turbine vane support 340 as shown in FIG. 3C. FIG. 3D illustrates an additional view of the turbine vane support 340 (e.g., the extension/heat shield 340a—see FIG. 3A) relative to the diffuser case 310. In FIG. 3D, the turbine case 316 is omitted for the sake of clarity. As shown in FIG. 3D, the turbine vane support 340 may include a slot 340g that may accommodate/seat an extension 310b (shown schematically) emanating from the diffuser case 310. When the extension 310b is coupled to/seated in the slot 340g the turbine vane support 340 may be precluded from rotating in an amount greater than a threshold.

While some of the illustrative embodiments described herein related to a turbine vane support for a turbine section of an engine, aspects of the disclosure may be applied in connection with other types of support structures for an engine. For example, the extension/heat shield 340a of FIG. 3A may be provided separately from the rest of the turbine vane support 340 in some embodiments to provide thermal protection for a flange (e.g., flange 304).

Technical effects and benefits of this disclosure include an extension of a lifetime of a of one or more engine cases by providing thermal protection for a flange associated with the engine cases. Stated slightly differently, the lifetime of the case(s) may be extended by reducing a thermal gradient over a span/length of the flange during engine operation. The thermal protection may be based on one or more of: (1) a ramp formed in a case that redirects a (combustion) airflow away from a case, (2) an extension of a turbine vane support that serves as a heat shield for the flange/cases, (3) a radial snap between the cases that is located radially outward of the flange to increase/enhance a radial gap between the turbine vane support and the flange/cases, (4) a radially inward projecting tab formed on a case that discourages the airflow from flowing in an aft to forward direction, or (5) a snap on the turbine vane support (e.g., the extension/heat shield) that provides a seal to a case.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An engine case system for a gas turbine engine having an axial centerline, comprising:
   a diffuser case;
   a turbine case;
   a substantially radially oriented flange coupling the diffuser case and the turbine case to one another; and
   a turbine vane support comprising a radially outward projecting tab, the radially outward projecting tab coupling the turbine vane support to the turbine case via a first radial interference fit, the turbine vane support further comprising an extension having a first axial end and a second axial end, the first axial end and the radially outward projecting tab disposed on a first axial side of the flange and the second axial end disposed on a second axial side of the flange axially opposite the first axial side,
   wherein the second axial end of the extension includes a snap coupling the turbine vane support to the diffuser case via a second radial interference fit, and
   wherein the extension is configured to be radially disposed between and spaced away from the flange and a combustor of the engine.

2. The system of claim 1, wherein the diffuser case includes a curved ramp disposed on a radially inner surface of the diffuser case proximate the second axial end of the extension.

3. The system of claim 1, wherein the turbine case includes a radially inward projecting tab, the radially inward projecting tab of the turbine case having a first axial side and the radially outward projecting tab of the turbine vane support having a second axial side in communication with the first axial side.

4. The system of claim 1, wherein a third radial interference fit is formed between the diffuser case and the turbine case.

5. The system of claim 4, wherein the third radial interference fit between the diffuser case and the turbine case is located radially outward of the flange.

6. The system of claim 1, further comprising:
   a vane coupled to the turbine vane support; and
   an anti-rotation tab projecting radially inward from an inner radial surface of the turbine vane support, the anti-rotation tab configured to prevents the vane from rotating in an amount greater than a threshold.

7. The system of claim 1, further comprising:
   a combustor lock mounting tab projecting radially inward from an inner radial surface of the turbine vane support, the combustor lock mounting tab configured to couples to a combustor lock so as to mount the turbine vane support to the combustor.

8. The system of claim 7,
   wherein the combustor lock mounting tab and the combustor lock are configured to be mounted together by a bolt and a nut.

9. The system of claim 1, wherein the turbine vane support includes a slot that seats a radial extension projecting from an inner radial surface of the diffuser case, an interface between the slot and the radial extension configured to prevent the turbine vane support from rotating in an amount greater than a threshold with respect to the diffuser case.

10. The system of claim 1, wherein the extension is made of a nickel alloy.

11. The system of claim 1, further comprising:
    a bolt and a nut that are seated with respect to a hole formed in the flange.

12. The system of claim 2, wherein the curved ramp comprises a curved ramp surface having a first ramp end proximate the extension and a second ramp end axially opposite the first ramp end and wherein the first ramp end is radially inward of the second ramp end.

* * * * *